United States Patent
You et al.

(10) Patent No.: US 11,871,069 B2
(45) Date of Patent: Jan. 9, 2024

(54) MULTIMEDIA SERVICE PROVIDING DEVICE AND MULTIMEDIA SERVICE PROVIDING METHOD

(71) Applicant: LG ELECTRONICS INC., Seoul (KR)

(72) Inventors: Hankyul You, Seoul (KR); Woonsuk Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 17/597,313

(22) PCT Filed: Jul. 26, 2019

(86) PCT No.: PCT/KR2019/009355
§ 371 (c)(1),
(2) Date: Jan. 3, 2022

(87) PCT Pub. No.: WO2021/020600
PCT Pub. Date: Feb. 4, 2021

(65) Prior Publication Data
US 2022/0321941 A1    Oct. 6, 2022

(51) Int. Cl.
H04N 21/43    (2011.01)
H04N 5/60    (2006.01)
H04N 21/4363    (2011.01)

(52) U.S. Cl.
CPC ......... *H04N 21/4307* (2013.01); *H04N 5/602* (2013.01); *H04N 21/43637* (2013.01)

(58) Field of Classification Search
CPC ............... H04N 21/4307; H04N 5/602; H04N 21/43637; H04N 21/43079; H04N 21/43615; H04R 2420/07; H04R 3/12
See application file for complete search history.

(56) References Cited

U.S. PATENT DOCUMENTS 9,398,344 B2 * 7/2016 Lee .................. H04N 21/4852
9,866,964 B1 * 1/2018 Haskin .................. H04R 27/00
(Continued)

FOREIGN PATENT DOCUMENTS

JP    2010-011274    1/2010
JP    2017-147594    8/2017
(Continued)

OTHER PUBLICATIONS

PCT International Application No. PCT/KR2019/009355, International Search Report dated May 25, 2020, 9 pages.

*Primary Examiner* — Fernando Alcon
(74) *Attorney, Agent, or Firm* — LEE, HONG, DEGERMAN, KANG & WAIMEY

(57) ABSTRACT

A multimedia service providing method according to an embodiment of the present invention may comprise: transmitting video data to a display device; transmitting a request message for requesting connection state information to one or more remote wireless speakers; receiving the connection state information from the one or more remote wireless speakers; separately calculating a delay time, which is a time at which a transmission delay is predicted, on the basis of the received connection state information; transmitting no audio data to a remote wireless speaker having a delay time longer than a preconfigured time from among the one or more remote wireless speakers; and transmitting the audio data to a remote wireless speaker having a delay time shorter than the preconfigured time from among the one or more remote wireless speakers, wherein the preconfigured time is configured to be a maximum allowable synchronization time difference between the video data and the audio data.

13 Claims, 10 Drawing Sheets

(56) References Cited

U.S. PATENT DOCUMENTS

| | | | |
|---|---|---|---|
| 11,196,899 B1 * | 12/2021 | Candelore | H04L 65/80 |
| 2013/0330053 A1 * | 12/2013 | Lee | H04N 21/41265 |
| | | | 386/201 |
| 2015/0095170 A1 * | 4/2015 | Lang | G06Q 20/20 |
| | | | 705/16 |
| 2017/0105038 A1 * | 4/2017 | Subramanya | H04N 21/439 |
| 2018/0084456 A1 * | 3/2018 | Gostev | H04L 1/1685 |
| 2020/0014742 A1 * | 1/2020 | Pollet | H04N 21/6125 |
| 2020/0091959 A1 * | 3/2020 | Curtis | H04B 1/7073 |
| 2021/0058442 A1 * | 2/2021 | Aggarwal | H04L 65/80 |
| 2022/0408146 A1 * | 12/2022 | Vyhmeister | H04N 21/41407 |
| 2023/0016118 A1 * | 1/2023 | Del Sordo | H04N 21/4305 |

FOREIGN PATENT DOCUMENTS

| | | | | |
|---|---|---|---|---|
| KR | 10-0677971 | | 2/2007 | |
| KR | 10-0793790 | | 1/2008 | |
| KR | 10-2019-0034206 | | 4/2019 | |
| TW | 201709716 A | * | 3/2017 | ............ G06T 19/006 |
| WO | WO-2023017986 A1 | * | 2/2023 | ......... G02B 27/0172 |

\* cited by examiner

[Fig.1]
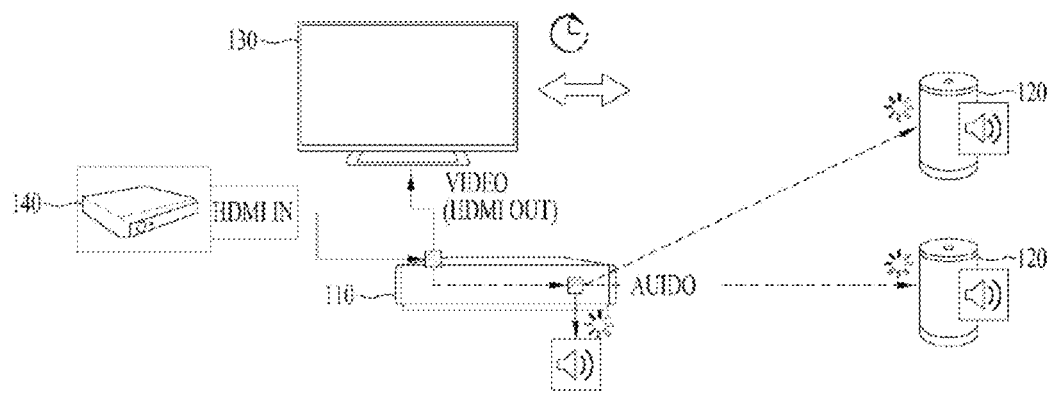
[Fig.2]
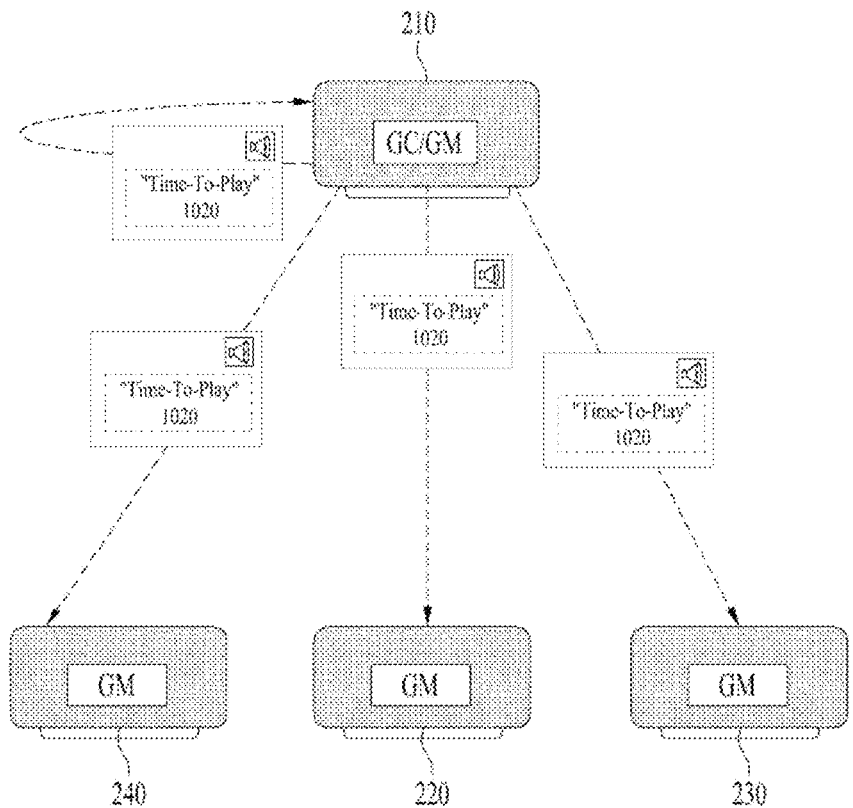

[Fig.3]
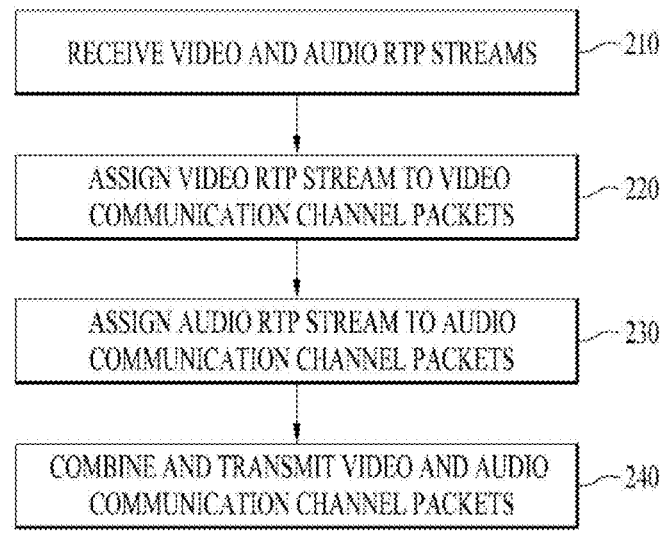

[Fig.4]
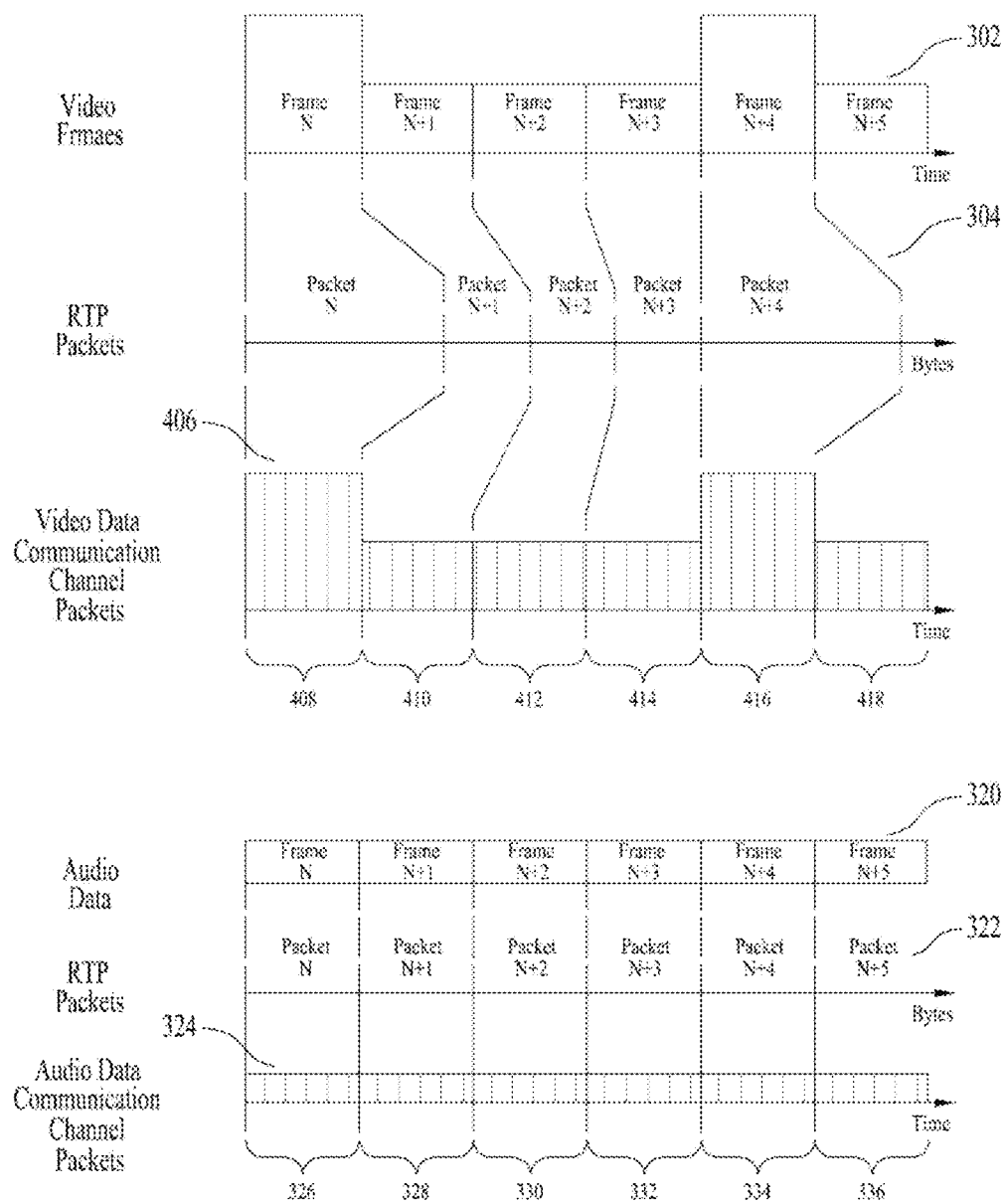

【Fig.5】
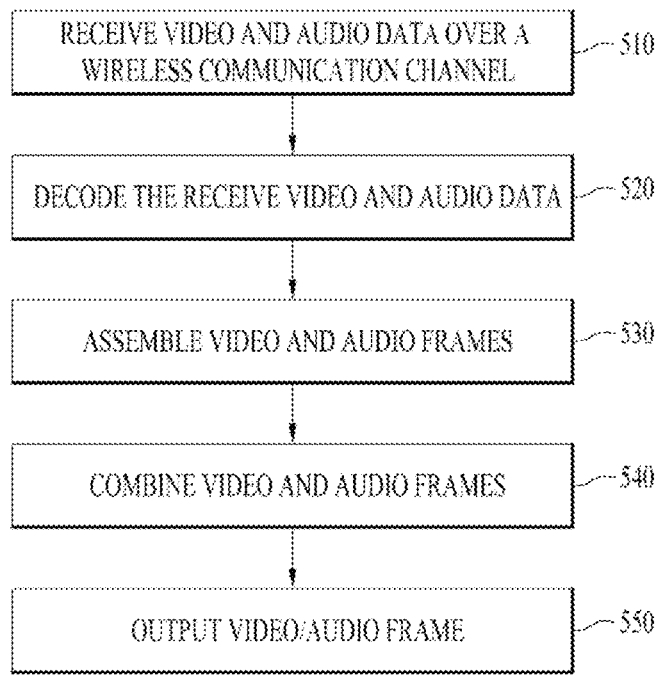
【Fig.6】
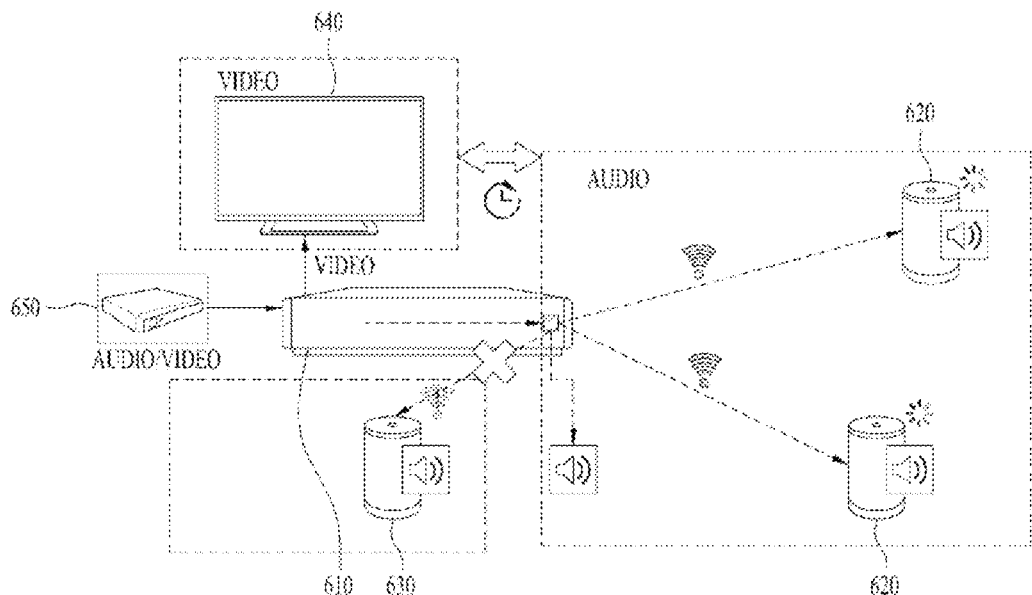

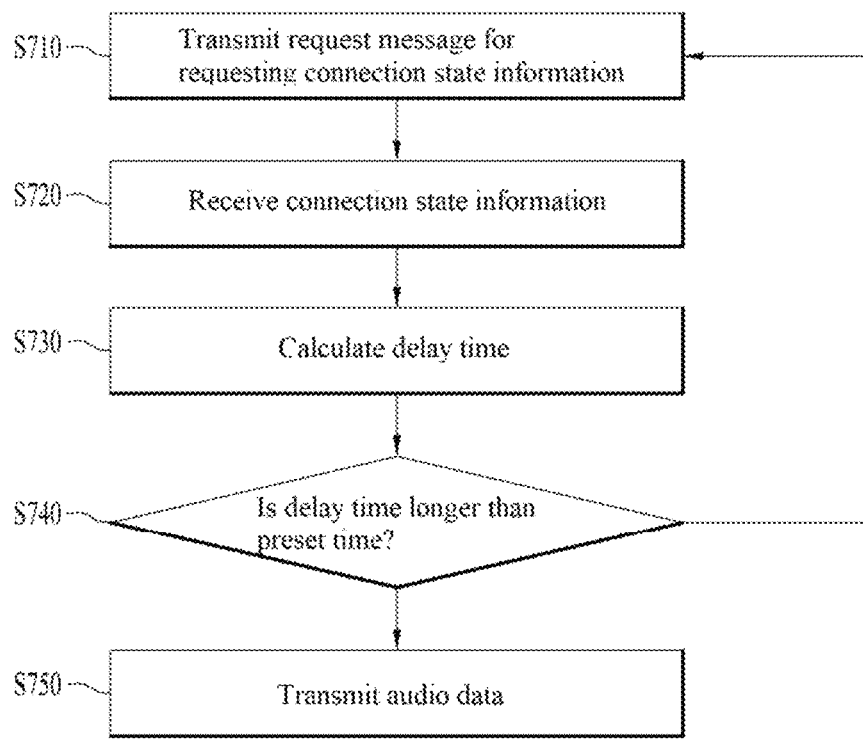
[Fig.7]

[Fig.8]
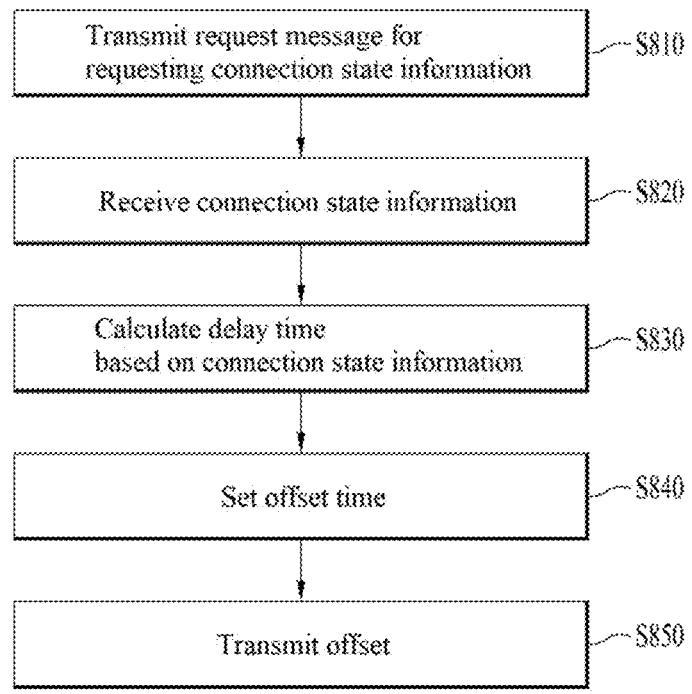

【Fig.9】
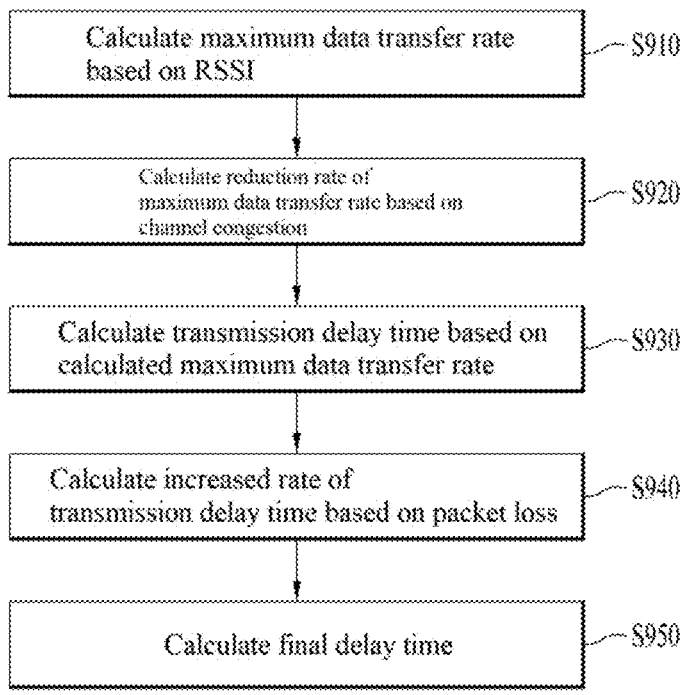
【Fig.10】
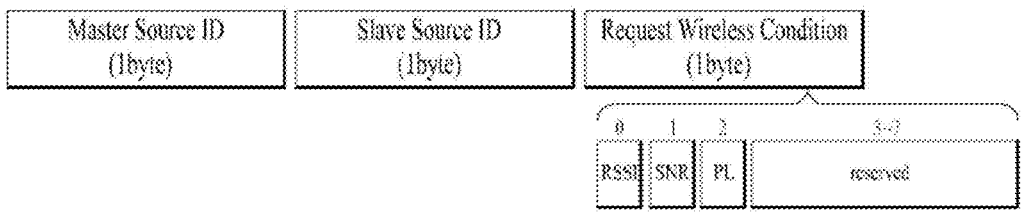

[Fig.11]

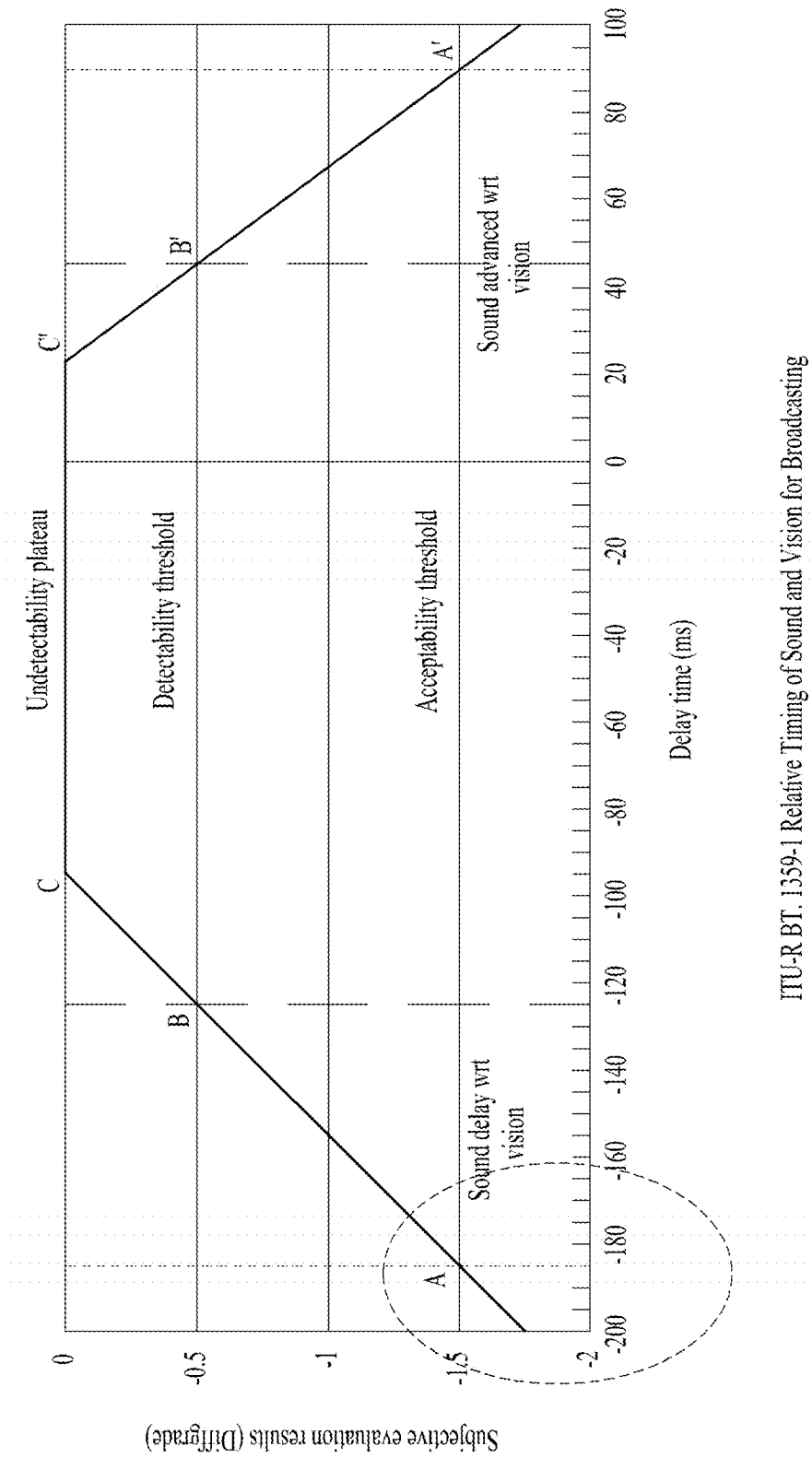

[Fig.13]
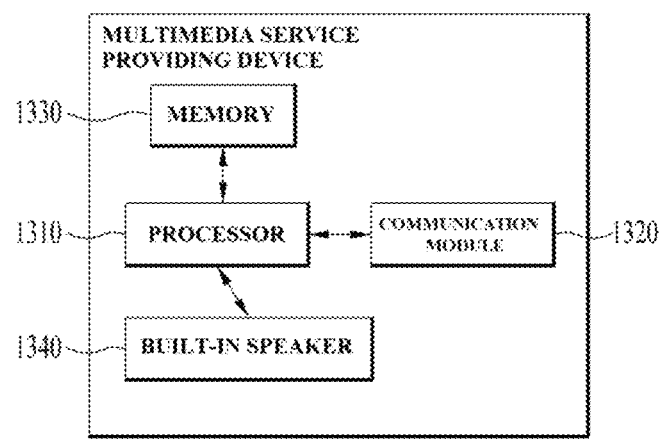

MULTIMEDIA SERVICE PROVIDING DEVICE AND MULTIMEDIA SERVICE PROVIDING METHOD

CROSS-REFERENCE TO RELATED APPLICATIONS

This application is the National Stage filing under 35 U.S.C. 371 of International Application No. PCT/KR2019/009355, filed on Jul. 26, 2019, the contents of which is hereby incorporated by reference herein in its entirety.

TECHNICAL FIELD

The present disclosure relates to a multimedia service providing apparatus. More specifically, the present disclosure relates to a multimedia service providing apparatus and method of providing a high-quality multimedia service by ensuring synchronization between video data and audio data.

BACKGROUND ART

Multimedia refers to media that provide information and entertainment to users by using various types of information content such as audio, video, and text. Since multimedia content uses video and sound, the amount of information is large and it is very intricate to process the large amount of information.

In the past, users had to visit movie theaters to receive high-quality multimedia services. However, in recent years, with the development of technology, demands of users to receive such a high-quality multimedia service even at home have increased.

In particular, a TV, which is the most used multimedia device at home, has increasingly provided image data of higher quality with the development of technology. In addition, the demands of users to be provided with high-quality audio data have also increased. However, it is difficult to satisfy such needs of the users only with a built-in speaker of the TV.

Accordingly, an audio device that provides a high-quality sound service through a plurality of speakers has been developed. However, since such an audio device should simultaneously provide the same sound service to a plurality of wirelessly connected speakers, technology for outputting synchronized audio data is required. In particular, since each speaker has a different wireless connection state, it is necessary to provide a sound service in consideration of the wireless connection state of each speaker.

Even if the audio data is synchronized in this way, technology for establishing synchronization between the video data of the TV and the audio data of the audio device is needed. However, the prior art has focused only on synchronization of the audio data, so that synchronization of the image data and the audio data is not guaranteed.

DETAILED DESCRIPTION OF THE DISCLOSURE

Technical Problems

An object of the present disclosure is to provide a multimedia service providing apparatus for ensuring synchronization of video data and audio data.

Another object of the present disclosure is to provide a multimedia service providing apparatus for controlling a plurality of audio devices having different wireless connection states to output audio data at the same time.

The technical objects to be achieved by the present disclosure are not limited to what has been particularly described hereinabove and other objects may be derived from the following description of embodiments.

Technical Solutions

According to an aspect of the present disclosure, provided herein is a method of providing a multimedia service, including transmitting video data to a display device; transmitting a request message for requesting connection state information to one or more remote wireless speakers; receiving the connection state information from the one or more remote wireless speakers; calculating each delay time during which transmission delay is predicted, based on the received connection state information; skipping transmission of audio data to remote wireless speakers having delay times longer than a preset time among the one or more remote wireless speakers; and transmitting the audio data to remote wireless speakers having delay times shorter than the preset time among the one or more remote wireless speakers. The preset time is set as a maximum allowable synchronization time difference between the video data and the audio data.

In each aspect of the present disclosure, the connection state information may include at least one of received signal strength indication, packet loss, or wireless channel congestion.

In each aspect of the present disclosure, the method of providing the multimedia service may further include setting a longest delay time among the delay times of the remote wireless speakers, which are shorter than the preset time, as an offset time; and transmitting the offset time to the remote wireless speakers having the delay times shorter than the preset time.

In each aspect of the present disclosure, the method of providing the multimedia service may further include providing the multimedia service by outputting the audio data by a built-in speaker.

In each aspect of the present disclosure, the built-in speaker may output the audio data at the same time as a playback time of the remote wireless speakers having the delay times shorter than the preset time.

In each aspect of the present disclosure, the method of providing the multimedia service may further include reporting information about the remote wireless speakers having the delay times longer than the preset time to a higher controller.

Advantageous Effects

According to an embodiment of the present disclosure, a multimedia service providing apparatus that ensures synchronization of video data and audio data is provided.

According to an embodiment of the present disclosure, a multimedia service providing apparatus that controls a plurality of remote wireless speakers having different wireless connection states to output audio data at the same time is provided.

The effects of the present disclosure are not limited to what has been particularly described hereinabove and other advantages may be derived from the following description of embodiments.

DESCRIPTION OF DRAWINGS

FIG. 1 illustrates a multimedia service providing apparatus that provides a multimedia service according to an embodiment.

FIG. 2 illustrates an audio synchronization method between audio output devices.

FIG. 3 illustrates a method of transmitting audio data and video data of a media transmission device.

FIG. 4 illustrates a method of performing synchronization of audio data and video data by changing a data transfer rate of a communication channel.

FIG. 5 illustrates a method of receiving audio data and video data of a media reception device.

FIG. 6 is a diagram illustrating a multimedia service providing system according to an embodiment of the present disclosure.

FIG. 7 is a flowchart illustrating a multimedia service providing method for ensuring synchronization of video data and audio data.

FIG. 8 is a flowchart illustrating a multimedia service providing method for ensuring synchronization of audio data between one or more remote wireless speakers.

FIG. 9 is a flowchart illustrating a method of calculating a delay time based on connection state information.

FIG. 10 illustrates a request message for requesting connection state information.

FIG. 11 illustrates connection state information responding to a request message.

FIG. 12 illustrates the degree of recognizing a synchronization difference by humans according to a delay time.

FIG. 13 is a diagram illustrating the construction of a multimedia service providing apparatus.

BEST MODE FOR CARRYING OUT THE DISCLOSURE

Reference will now be made in detail to the exemplary embodiments of the present disclosure, examples of which are illustrated in the accompanying drawings. The construction of an apparatus, which will be described hereinbelow, is intended to explain exemplary embodiments of the present disclosure, rather than to show the only embodiments that can be implemented according to the disclosure. The same reference numbers will be used throughout this specification to refer to the same or like parts.

Although most terms used herein have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

FIG. 1 illustrates a multimedia service providing apparatus that provides a multimedia service according to an embodiment.

Referring to FIG. 1, a multimedia service providing apparatus 110 may be connected to a display device 130 and one or more remote wireless speakers 120 to provide a multimedia service.

More specifically, the multimedia service providing apparatus 110 may be connected to the display device 130 by wire and may be connected to the one or more remote wireless speakers 120 wirelessly. Here, the wired connection method may use a high definition multimedia interface (HDMI) cable but is not limited thereto. The wireless connection method may use wireless local area network (WLAN), Bluetooth (BT), Zigbee, Z-Wave, ultra-wide band (UWB), ultra-narrow band (UNB), WirelessUSB, wireless gigabit (WiGig), Bluetooth low energy (BLE), WirelessHD, TransferJet, Wireless FireWire, etc.

The multimedia service providing apparatus 110 may act as a master device for controlling the display device 130 and the remote wireless speakers 120. The remote wireless speakers 120 may act as slave devices controlled by the master device.

The multimedia service providing apparatus 110 may receive video data and audio data from a set-top box. The multimedia service providing apparatus 110 may transmit the video data to the display device 130. Here, since the video data is transmitted by wire, the multimedia service providing apparatus 110 does not need to consider a connection state with the display device 130. This is because the multimedia service providing apparatus 110 and the display device 130 are connected through a cable, so that the connection state is not changed in real time according to a surrounding environment.

The multimedia service providing apparatus 110 may provide the audio data to the one or more remote wireless speakers 120. Here, the multimedia service providing apparatus 110 and the remote wireless speakers 120 may be wirelessly connected. Accordingly, the wireless connection state is changed in real time by various environmental factors that hinder the wireless connection state.

If the multimedia service providing device 110 simultaneously transmits the audio data to the remote wireless speakers 120, and the remote wireless speakers 120 simultaneously receive and output the audio data, synchronization between the remote wireless speakers 120 is not guaranteed. This is because, since each remote wireless speaker 120 has a different wireless connection state, timings at which the remote wireless speakers 120 receive the audio data are all different. Accordingly, the multimedia service providing apparatus 110 needs to transmit the audio data in consideration of the wireless connection states of the respective remote wireless speakers 120.

Assume that there are remote wireless speakers 120 having considerably poor wireless connection states. In order to ensure synchronization between the remote wireless speakers 120, a speaker having the worst wireless connection state should be used as a reference. Accordingly, speakers having good wireless connection states should output the audio data after a predetermined time since the speakers have received the audio data.

However, if synchronization only between the remote wireless speakers 120 is considered, synchronization of the video data and the audio data may not be guaranteed. This is because the display device 130 outputs the video data without considering the wireless connection states of the remote wireless speakers 120. Accordingly, there is a need for a multimedia service providing apparatus capable of ensuring synchronization of the video data and the audio data in order to provide a high-quality multimedia service.

FIG. 2 illustrates an audio synchronization method between audio output devices.

Referring to FIG. 2, a general synchronization method between a plurality of wirelessly connected audio output devices is illustrated.

More specifically, a master speaker 210 may be wirelessly connected to a plurality of slave speakers 220, 230, and 240 to form a group. Here, when a new slave speaker 240 is added to the group, the master speaker 210 may perform synchronization by calculating a time offset.

The master speaker 210 may calculate an actual playback time in consideration of wireless connection states of the slave speakers 220, 230, and 240 and a transmission time over a network. The master speaker 210 may transmit the actual playback time together with audio data to each of the slave speakers 220, 230, and 240. Accordingly, the slave speakers may reproduce the received audio data at the received actual playback time. The master speaker 210 may also reproduce the audio data at the calculated actual playback time. Accordingly, the master speaker 210 and the slave speakers 220, 230, and 240 may be synchronized to output the audio data. However, since this method guarantees only audio synchronization within a system, there is a disadvantage in that synchronization of video data is not guaranteed.

FIGS. 3 to 5 illustrate a synchronization method of audio data and video data in a general wireless communication system.

FIG. 3 illustrates a method of transmitting audio data and video data of a media transmission device.

Referring to FIG. 3, the media transmission device may extract each of video data and audio data to generate real-time transport protocol (RTP) frame packets of the video data and the audio data. The media transmission device may transmit the RTP frame packets to a media reception device through a separate wireless communication channel.

FIG. 4 illustrates a method of performing synchronization of audio data and video data by changing a data transfer rate of a communication channel.

Referring to FIG. 4, in order to guarantee the same transmission time for an audio frame and a video frame, a data transfer rate of a video communication channel may be changed according to a video frame size.

FIG. 5 illustrates a method of receiving audio data and video data of a media reception device.

Referring to FIG. 5, the media reception device may receive each of audio data and video data. After decoding the received data, the media reception device may combine the audio data and the video data. The media reception device may then output the combined data.

According to the synchronization method of the audio data and the video data of FIGS. 3 to 5, synchronization of each of the audio data and the video data may be ensured only when the audio data and the video data are output from the same device. That is, when the audio data and the video data are output from different devices, synchronization may not be guaranteed.

Accordingly, a method for synchronization when the audio data and the video data are output from different devices is needed.

FIG. 6 is a diagram illustrating a multimedia service providing system according to an embodiment of the present disclosure.

Referring to FIG. 6, a multimedia service providing apparatus 610 according to an embodiment of the present disclosure may control audio data transmission and an actual playback time, in consideration of a wireless environment. Accordingly, the multimedia service providing apparatus 610 according to an embodiment of the present disclosure may ensure synchronization of audio data and video data in a system.

The multimedia service providing apparatus 610 according to an embodiment of the present disclosure may receive video data and audio data from a set-top box 650. The multimedia service providing apparatus 610 may transmit the received video data to a display device 640. In this case, the display device 640 may mean a device capable of outputting video data, such as a TV, a computer, or a monitor, but is not limited thereto. In addition, the display device 640 and the multimedia service providing apparatus 610 may be connected to each other by wire, but is not limited to such a wired connection.

The multimedia service providing apparatus 610 according to an embodiment of the present disclosure may form a group together with one or more remote wireless speakers 620 and 630 so that the remote wireless speakers 620 and 630 may simultaneously output audio data. More specifically, the multimedia service providing apparatus 610 according to an embodiment of the present disclosure may act as a master device that controls an audio system forming a group. The one or more remote wireless speakers 620 and 630 may act as slave devices that are wirelessly connected to the master device to perform operation.

The multimedia service providing apparatus 610 according to an embodiment of the present disclosure may transmit a request message for requesting connection state information to the one or more remote wireless speakers 620 and 630 in order to detect a change in a real-time wireless environment. In this case, the request message may be periodically transmitted. Alternatively, the request message may be transmitted at a time set by input of a user or at a preset time, but is not limited thereto.

The remote wireless speakers 620 and 630 may transmit the connection state information to the multimedia service providing apparatus 610 in response to the received request message. The connection state information may include received signal strength, packet loss, or wireless channel congestion.

The multimedia service providing apparatus 610 according to an embodiment of the present disclosure may use the received connection state information to calculate a delay time during which transmission delay is predicted. Here, the delay time may mean a prediction time consumed for the multimedia service providing apparatus 610 to transmit audio data to the remote wireless speakers 620 and 630. That is, the delay time may mean a time taken from a time when the multimedia service providing apparatus 610 transmits the audio data to a time when the remote wireless speakers 620 and 630 receive the audio data. This delay time may be changed in real time according to a surrounding environment. For example, the surrounding environment may be one in which an obstacle that hinders the flow of wireless data is located between the multimedia service providing apparatus 610 and the remote wireless speakers 620 and 630 or in which data loss occurs due to occurrence of noise.

A wireless environment may be worsened so that an excessively large delay time may be predicted at the remote wireless speaker 630. If all speakers in the audio system output the audio data at such a large delay time of the remote wireless speaker, a problem in that synchronization of the audio data and the video data is not guaranteed may arise.

Therefore, transmission of the audio data to the remote wireless speaker 630 that does not guarantee synchronization of the audio data and the video data among the one or more remote wireless speakers 620 and 630 may be temporarily limited. Further, the audio data may not be temporarily transmitted to the remote wireless speaker 630 having a delay time longer than the preset time. In this case, the remote wireless speaker 630 that has failed to receive the audio data may output silence.

Here, the preset time may be set as a maximum allowable synchronization time difference between the video data and the audio data. More specifically, the maximum allowable synchronization time difference may mean a time during which synchronization of the audio data and the video data is ensured. Ensuring synchronization may mean ensuring synchronization at a level incapable of being recognized by humans, rather than adjusting synchronization at the exactly same level. For example, the maximum allowable synchronization time difference may be set to 180 ms or 150 ms.

While the multimedia service providing apparatus 610 according to an embodiment of the present disclosure provides a minute difference in synchronization between the video data and the audio data, such a minute difference may be a difference that a person is incapable of recognizing. Accordingly, the user may be provided with a high-quality multimedia service.

FIG. 7 is a flowchart illustrating a multimedia service providing method for ensuring synchronization of video data and audio data.

Referring to FIG. 7, the multimedia service providing method according to an embodiment of the present disclosure may include transmitting video data to a display device.

The multimedia service providing method according to an embodiment of the present disclosure may include transmitting a request message for requesting connection state information to one or more remote wireless speakers (S710).

The multimedia service providing method according to an embodiment of the present disclosure may include receiving the connection state information from one or more remote wireless speakers (S720).

The multimedia service providing method according to an embodiment of the present disclosure may include calculating each delay time during which transmission delay is predicted, based on the received connection state information (S730).

The multimedia service providing method according to an embodiment of the present disclosure may include determining whether the delay time is longer than a preset time (S740).

Accordingly, the multimedia service providing method according to an embodiment of the present disclosure may include skipping transmission of the audio data to a remote wireless speaker having a delay time longer than the preset time among the one or more remote wireless speakers and transmitting the audio data to a remote wireless speaker having a delay time shorter than the preset time among the one or more remote wireless speakers (S750). Here, the preset time may be set as a maximum allowable synchronization time difference between the video data and the audio data.

The multimedia service providing method according to an embodiment of the present disclosure may further include providing a multimedia service by outputting, by a built-in specker, the audio data. The built-in speaker may output the audio data at the same time as a playback time of the remote wireless speaker having the delay time shorter than the preset time. Here, the built-in speaker may be controlled by a processor of the multimedia service providing apparatus. The audio data may be stored in a local buffer of the multimedia service providing apparatus.

In addition, the multimedia service providing method according to an embodiment of the present disclosure may further include reporting information about a remote wireless speaker having a delay time longer than the preset time to a higher controller.

Accordingly, the user may check information about a remote wireless speaker having a poor wireless connection state to improve the connection state.

FIG. 8 is a flowchart illustrating a multimedia service providing method for ensuring synchronization of audio data between one or more remote wireless speakers.

Referring to FIG. 8, the multimedia service providing method according to an embodiment of the present disclosure may include transmitting a request message for requesting connection state information to one or more remote wireless speakers (S810).

The multimedia service providing method according to an embodiment of the present disclosure may receive the connection state information from the one or more remote wireless speakers (S820).

The multimedia service providing method according to an embodiment of the present disclosure may include calculating each delay time, which is a time during which transmission delay is predicted, based on the received connection state information (S830).

The multimedia service providing method according to an embodiment of the present disclosure may include setting a longest delay time among delay times of remote wireless speakers, which are shorter than a preset time, as an offset time (S840).

The multimedia service providing method according to an embodiment of the present disclosure may include transmitting the offset time to the wireless speakers having the delay times shorter than the preset time (S850).

FIG. 9 is a flowchart illustrating a method of calculating a delay time based on connection state information.

The multimedia service providing method according to an embodiment of the present disclosure may include receiving connection state information from one or more remote wireless speakers. Here, the connection state information may include at least one of received signal strength indication, packet loss, or wireless channel congestion.

The multimedia service providing method according to an embodiment of the present disclosure may include calculating a delay time of each of one or more remote wireless speakers based on the received connection state information.

Referring to FIG. 9, the multimedia service providing method according to an embodiment of the present disclosure may include calculating a maximum data transfer rate based on RSSI (S910). Here, received signal strength indication (RSSI) represents a difference in magnitude between a radio signal strength output from an antenna and a received signal strength and may be measured in dB or dBm.

TABLE 1

| Range of RSSI (dBm) | Maximum Data Transfer Rate (Mbps) |
| --- | --- |
| 0~−64 | 54 |
| −64~−66 | 48 |
| −66~−68 | 36 |
| −68~−71 | 24 |
| −71~−74 | 18 |
| −74~−78 | 9 |
| <−78 | 6 |

Table 1 illustrates an example of the maximum data transfer rate according to the RSSI.

According to an embodiment of the present disclosure, in the multimedia service providing method, the maximum data transfer rate may be calculated using a table as shown in Table 1 according to the RSSI.

Table 1 is only an example of the maximum data transfer rate according to the RSSI, and the maximum data transfer rate may be calculated using various tables without being limited to Table 1.

The multimedia service providing method according to an embodiment of the present disclosure may calculate a reduction rate of the maximum data transfer rate based on received wireless channel congestion (S920). Accordingly, when the state of a wireless channel is congested, the maximum data transfer rate calculated in step S910 may be greatly reduced.

The multimedia service providing method according to an embodiment of the present disclosure may include calculating a transmission delay time based on the calculated maximum data transfer rate (S930). In this case, the transmission delay time may be inversely proportional to the maximum data transfer rate and may have a different value according to audio specifications.

TABLE 2

| Maximum Data Transfer Rate (Mbps) | Transmission Delay (1) Audio Specification (24 bits, 192 kHz, 20 ms) |
|---|---|
| 54 Mbps | 2 ms |
| 48 Mbps | 4 ms |
| 36 Mbps | 10 ms |
| 24 Mbps | 20 ms |
| 18 Mbps | 30 ms |
| 9 Mbps | 40 ms |
| 6 Mbps | 80 ms |

Table 2 illustrates audio transmission delay compared to the maximum data transfer rate.

In the multimedia service providing method according to an embodiment of the present disclosure, the transmission delay time may be calculated with reference to Table 2. However, Table 2 is only exemplary and the transmission delay is not limited thereto.

The multimedia service providing method according to an embodiment of the present disclosure may include calculating an increased rate of the transmission delay time based on received packet loss (S940). Here, the calculated transmission delay time may increase in proportion to the packet loss.

The multimedia service providing method according to an embodiment of the present disclosure may include calculating a final delay time (S950).

FIG. 10 illustrates a request message for requesting connection state information.

The multimedia service providing method according to an embodiment of the present disclosure may include transmitting a request message for requesting connection state information to one or more remote wireless speakers.

Here, the request message may include a master source ID, a slave source ID, and a request for a wireless condition. The request for the wireless condition may be configured by being divided into fields of 8 bits. The request for the wireless condition may include an RSSI field (0 bits), a wireless channel congestion field (based on a signal-to-noise ratio (SNR)) (1 bit), a packet loss (PL) field (2 bits), and a reserved field (3 to 7 bits).

FIG. 11 illustrates connection state information responding to a request message.

The multimedia service providing method according to an embodiment of the present disclosure may include receiving the connection state information from one or more remote wireless speakers.

Referring to FIG. 11, the connection state information may include a master source ID (1 byte), a slave source ID (1 byte), RSSI (0 db to −255 db, 2 bytes), wireless channel congestion (based on an SNR) (0% to 100%, 1 byte), and packet loss (0% to 100%, 1 byte).

FIG. 12 illustrates the degree of recognizing a synchronization difference by humans according to a delay time.

Referring to FIG. 12, in the multimedia service providing method according to an embodiment of the present disclosure, a synchronization time difference of video data and audio data may be set as a maximum synchronization time difference allowable by humans. More specifically, a delay time calculated using a wireless connection state may be classified into a level that is undetectable by a person, a level that is detectable by a person, and a level that is acceptable by a person, according to size.

More specifically, if the delay time exceeds 180 ms, the delay time is out of an acceptable level by a person, so that the level of a multimedia service that simultaneously provides audio and video is degraded. Accordingly, the multimedia service providing method according to an embodiment of the present disclosure may prevent one or more remote wireless speakers from outputting audio data beyond a maximum allowable synchronization time difference.

The maximum allowable synchronization time may be set to 180 ms, more desirably, to 150 ms. However, the maximum allowable synchronization time is not limited thereto and may be adjusted according to the level of the multimedia service.

As described above, the multimedia service providing apparatus to which the present disclosure is applied may maintain synchronization between a video signal and an audio signal by stopping the audio output of some speakers according to wireless connection states of a plurality of remote wireless speakers.

However, when this multimedia service providing apparatus controls a plurality of slave speakers as a master device and provides a service as a group to the slave speakers to which respective predetermined roles (e.g., a left speaker and a right speaker) are given, the quality of the multimedia service itself may be deteriorated due to the output stop of a specific speaker.

Accordingly, when the output of the audio signal to a specific speaker is stopped according to the wireless connection state and a specific function of all multimedia services is given to the specific speaker, an embodiment of the present disclosure proposes that the specific function be performed by another speaker and the plural slave speakers be transformed to a mode providing the same audio service.

FIG. 13 is a diagram illustrating the construction of a multimedia service providing apparatus.

Referring to FIG. 13, the multimedia service providing apparatus according to an embodiment of the present disclosure may include a processor 1310, a communication module 1320, a memory 1330, and a built-in speaker 1340.

More specifically, the communication module 1320 according to an embodiment of the present disclosure may transmit video data to a display device, transmit a request message for requesting connection state information to one or more remote wireless speakers, and receive the connection state information from the one or more remote wireless speakers.

The memory 1330 according to an embodiment of the present disclosure may be connected to the communication module 1320 to store audio data.

The processor 1310 according to an embodiment of the present disclosure may be connected to the communication module 1320 and the memory 1330 and may calculate a delay time, which is a time during which transmission delay is predicted, based on the connection state information. The processor 1310 may control the communication module 1320 not to transmit audio data to remote wireless speakers having delay times longer than a preset time among the one or more remote wireless speakers and control the communication module 1320 to transmit the audio data to remote wireless speakers having delay times shorter than the preset time among the one or more remote wireless speakers. Here, the preset time may be set as a maximum allowable synchronization time difference between the video data and the audio data.

The connection state information may include at least one of RSSI, packet loss, or wireless channel congestion.

The processor 1310 according to an embodiment of the present disclosure may set the longest delay time among the delay times of the remote wireless speakers, which are shorter than the preset time, as an offset time and control the communication module 1320 to transmit the offset time to the remote wireless speakers having the delay times shorter than the preset time.

The built-in speaker 1340 according to an embodiment of the present disclosure may output audio data to provide a multimedia service.

The processor 1310 according to an embodiment of the present disclosure may control the built-in speaker 1340 to output the audio data at the same time as a playback time of the remote wireless speakers having the delay times shorter than the preset time.

The processor 1310 according to an embodiment of the present disclosure may control a controller to report information about the remote wireless speakers having the delay times longer than the preset time to a higher controller.

The multimedia service providing apparatus according to an embodiment of the present disclosure may be implemented as a sound bar that provides synchronized data to the one or more remote wireless speakers and the display device.

It will be understood by those skilled in the art that various modifications and variations can be made without departing from the spirit or scope of the present disclosure. Thus, the present disclosure covers all modifications and variations of the present disclosure provided they come within the scope of the appended claims and their equivalents.

In this disclosure, both the apparatus and method have been described. The descriptions of both the apparatus and method may be complementarily applied.

Modules, units, or blocks according to embodiments of the present disclosure may be processors, hardware, and/or software executing a series of processes stored in a memory (or a storage unit). The steps or methods described in the embodiments may be performed by the processors, hardware, and/or software. The methods proposed in the present disclosure may be implemented as code. The code may be written on a processor-readable storage medium and thus may be read by a processor provided by the apparatus according to embodiments of the present disclosure.

INDUSTRIAL APPLICABILITY

The multimedia service providing apparatus and method as described above are applicable to various electronic devices.

What is claimed is:

1. A method of providing a multimedia service, the method comprising:
    transmitting video data to a display device;
    transmitting a request message for requesting connection state information to one or more remote wireless speakers;
    receiving the connection state information from the one or more remote wireless speakers;
    calculating each delay time during which transmission delay is predicted, based on the received connection state information;
    configuring a threshold time based on a maximum allowable synchronization time difference between the video data and the audio data;
    skipping transmission of audio data to a remote wireless speaker, among the one or more remote wireless speakers, having a delay time longer than the threshold time; and
    transmitting the audio data to a remote wireless speaker, among the one or more remote wireless speakers, having a delay time shorter than the threshold time.

2. The method of claim 1, wherein the connection state information includes at least one of received signal strength indication, packet loss, or wireless channel congestion.

3. The method of claim 1, further comprising:
    setting a longest delay time, among delay times of the remote wireless speakers which are shorter than the threshold time, as an offset time; and
    transmitting the offset time to the remote wireless speakers having the delay times shorter than the threshold time.

4. The method of claim 1, further comprising providing the multimedia service by outputting the audio data by a built-in speaker.

5. The method of claim 4, wherein the built-in speaker outputs the audio data at the same time as a playback time of the remote wireless speakers having the delay times shorter than the threshold time.

6. The method of claim 1, further comprising reporting information about the remote wireless speakers having the delay times longer than the threshold time to a higher controller.

7. An apparatus for providing a multimedia service, the apparatus comprising:
    a processor; and
    a memory operably connected to the processor and configured to store instructions that, when executed, cause the processor to perform operations comprising:
    transmitting video data to a display device;
    transmitting a request message for requesting connection state information to remote wireless speakers; and
    receiving the connection state information from the remote wireless speakers;
    calculating each delay time during which transmission delay is predicted, based on the connection state information;
    configuring a threshold time based on a maximum allowable synchronization time difference between the video data and the audio data;
    skipping transmission of audio data to a remote wireless speaker, among the remote wireless speakers, having a delay time longer than the threshold time;
    transmitting the audio data to a remote wireless speaker among the remote wireless speaker, having a delay time shorter than the threshold time.

8. The apparatus of claim 7, wherein the connection state information includes at least one of received signal strength indication, packet loss, or wireless channel congestion.

9. The apparatus of claim 7, wherein the operations further comprising:
    setting a longest delay time, among delay times of the remote wireless speakers which are shorter than the threshold time, as an offset time, and
    transmitting the offset time to the remote wireless speaker having the delay time shorter than the threshold time.

10. The apparatus of claim 7, further comprising a built-in speaker providing the multimedia service by outputting the audio data.

11. The apparatus of claim 10, wherein the built-in speaker outputs the audio data at the same time as a playback time of the remote wireless speaker having the delay time shorter than the threshold time.

12. The apparatus of claim 7, wherein the operations further comprise reporting information about the remote wireless speaker having the delay time longer than the threshold time to a higher controller.

13. The apparatus of claim 7, wherein the apparatus is a sound bar providing synchronized data to the remote wireless speakers and the display device.

* * * * *